(12) United States Patent
Yoda

(10) Patent No.: US 7,715,691 B2
(45) Date of Patent: May 11, 2010

(54) IMAGE SERVICE PROVIDING APPARATUS AND RECORDING MEDIUM

(75) Inventor: Akira Yoda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1397 days.

(21) Appl. No.: 10/670,423

(22) Filed: Sep. 26, 2003

(65) Prior Publication Data

US 2004/0071452 A1 Apr. 15, 2004

(30) Foreign Application Priority Data

Sep. 30, 2002 (JP) ............................. 2002-287188

(51) Int. Cl.
*H04N 5/91* (2006.01)
(52) U.S. Cl. ...................... 386/95; 386/107; 386/117
(58) Field of Classification Search .................. 386/46, 386/95, 52, 107, 117, 120; 348/231.3
See application file for complete search history.

(56) References Cited

U.S. PATENT DOCUMENTS 6,307,550 B1 * 10/2001 Chen et al. .................. 345/418
6,762,791 B1 * 7/2004 Schuetzle ................. 348/231.3
6,943,909 B2 * 9/2005 Goldstein et al. ........... 358/1.15
7,057,648 B2 * 6/2006 Parulski et al. ............ 348/231.2

FOREIGN PATENT DOCUMENTS

| JP | 5-199491 A | 8/1993 |
|---|---|---|
| JP | 10-283404 A | 10/1998 |
| JP | 2001-69415 A | 3/2001 |
| JP | 2001-292404 A | 10/2001 |
| JP | 2002-142110 A | 5/2002 |
| JP | 2002-185885 A | 6/2002 |
| JP | 2002-223379 A | 8/2002 |

* cited by examiner

*Primary Examiner*—Huy T Nguyen
(74) *Attorney, Agent, or Firm*—Birch, Stewart, Kolasch & Birch, LLP

(57) ABSTRACT

A video image file constituted by video data and attendant data formed by an image pickup device is input to an image service providing apparatus. Image services such as image distribution, medium recording, and printing are described in the attendant data. In the image service providing apparatus, an image service type is specified by a service selecting device on the basis of the attendant data, and a service switching device is switched to output the video data to any one of a distribution device, a recording device, an image forming device, and a video editing device. Therefore, any one of distribution, recording, image formation, and image editing of the video image file can be easily executed.

11 Claims, 9 Drawing Sheets

IMAGE SERVICE PROVIDING APPARATUS AND RECORDING MEDIUM

CROSS-REFERENCE TO RELATED APPLICATION

This application claims priority under 35 USC 119 from Japanese Patent Application No. 2002-287188, the disclosure of which is incorporated by reference herein.

BACKGROUND OF THE INVENTION

1. Field of the Invention

The present invention relates to an image service providing apparatus and a recording medium and, more particularly, to an image service providing apparatus and a recording medium which provide an image service related to video data representing, e.g., a video image photographed by a photographing device.

2. Description of the Related Art

A photographing device such as a so-called digital camera having the following configuration has rapidly become popular in recent years. That is, an object is photographed by an image pickup device such as a CCD, an analog image signal obtained by photographing is converted into digital image data, and the digital image data is stored in an information storage medium such as an IC card. Since the photographing device such as a digital camera generally handles a photographed image as image data, it has been easy for the image data to be stored in a storage medium and carried or electrically transmitted.

For this reason, when, for example, a photographed image was required to be printed, the photographed image was stored in a medium and carried or electrically transmitted to request that the photographed image be printed. In order to easily deal with such a print order, order information for printing a photograph is constituted by information related to an orderer and information in which order contents are described, and is recorded on a medium such that the order information can be read by a computer. The medium makes it easy to execute a print order (for example, see FIG. 1 in pp. 3-4 in Japanese Patent Application Laid-Open (JP-A) No. 10-283404).

However, in recent years, a digital camera which can photograph a video image has been in circulation. In the digital camera, a video image is a data group in which still images are continuous in a time-series, and a video image file constituted by the data group is handled as video image data, so that photographing of the video image can be easily realized by a digital camera which can photograph a still image. An order for printing the video image can be placed by exhibiting the video image file.

However, when a video image photographed by a digital camera is handled as a video image file, the first still image in the video image file is often displayed when the video image is displayed by a computer. For this reason, a user who refers to the displayed still image confuses photographed images included in the video image file with mere still images, and thus the user may place an order for printing the still images. In this case, a print service trader prints all the images in the video image file, and provides large numbers of prints to the user on the basis that the articles have been ordered.

When an order of printing images is placed from video images photographed by a digital camera, a video image file is exhibited as original data because an object to be ordered is the video image file and because all the still images (photographed images) included in the video image file are printed.

More specifically, it has been difficult to decide whether all the photographed images in the video image file or some of the photographed images should be printed.

SUMMARY OF THE INVENTION

The present invention has been made in consideration of the above facts, and has as its object to obtain an image service providing apparatus and a recording medium which can easily provide an image service which is a process for a video image photographed by a photographing device.

In order to achieve this image service, an image service providing apparatus according to the invention includes an input unit for inputting a video image file obtained by adding, to video data representing a plurality of continuous still images photographed by a photographing device, attendant data representing an image service corresponding to processing of the still images included in the video data; a setting unit for setting a type of image service on the basis of the attendant data included in the video image file by the input unit; and a processing unit for processing the image service for the video data included in the video image file input by the input unit on the basis of a setting result obtained by the setting unit.

In the image service providing apparatus of the invention, a video image file is input by the input unit. The video image file is obtained by adding, to video data representing a plurality of continuous still images photographed by a photographing device, attendant data representing image service corresponding to processing of the still images included in the video data. The additional data can be designated in units of still images included in the video data, and represents an image service corresponding to processing of the still images included in the video data. Therefore, the input video image file is constituted by video data and additional data for specifying image service for the video data.

The attendant data included in the input video image file is referred to by the setting unit, and a type of an image service is set on the basis of the attendant data. On the basis of the setting result, the processing unit processes the image service for the video data included in the input video image file. In this manner, an image service appropriate to the video image file can be provided.

The attendant data includes photographing conditions of the photographing device at a time when the video data is obtained.

In an image pickup device, various settings are made depending on the photographing environment. When the various settings are known, the various settings can be effectively used when the still images included in the video data are processed. The photographing conditions may be common in all video image files, or may depend on each still image of the video data included in the video image file.

The attendant data includes a concealed condition for setting the video data to make it possible to process the video data.

The video data may depend on an intention of a photographer or a holder of the video image file, i.e., an intention to show the images to a large number of users, an intention to show the images to a specific user, or an intention to conceal the images. For this reason, when the attendant data includes a concealed condition such as a password or a secret identification code for setting video data to make it possible to process the video data, the intentions of the user can be easily taken into account as a video image file.

The processing unit includes an image forming unit for forming a still image in a recording material.

As a type of image service, print forming is cited as an example. In this case, the processing unit includes an image forming unit for forming a still image on a recording medium to make it possible to perform image formation such as printing. As image formation, printing of still images included in video data, index printing of still images included in video data, label printing for a medium, and the like are cited.

The processing unit includes an image recording unit for recording the video image file on a recording medium.

Some users desire that the video image file be stored. By recording the video image file on the recording medium, the video image file can be easily recorded and stored in the image recording unit. As the recording medium, a recording medium such as a flexible disk, an IC disk, a CDROM, a DVD, or an MO which uses light or magnetism is cited as an example.

The processing unit includes an image distribution unit for distributing still images to another apparatus.

There are circumstances when some holders such as photographers who hold a video image file desire the video image file be distributed to another user. For this reason, the processing unit includes an image distribution unit for distributing at least still images to another apparatus to make it possible to easily distribute the video image file in accordance with the intentions of a holder. As this distribution, distribution performed by electric transmission such as electronic mail or image stream presentation is typically used.

The processing unit includes a video editing unit for editing the video data, and processes the edited video data edited by the video editing unit as the video data.

Some holders such as photographers who hold a video image desire that the video image file to be edited such that a desired still image be extracted or deleted. Therefore, the processing unit includes a video editing unit for editing video data to process the edited video data edited by the video editing unit as video data, so that a video image file constituted by video data on which the intention of the user (holder) is reflected can be generated.

The processing unit includes an attendant data editing unit for editing the attendant data, and uses the edited attendant data edited by the attendant data editing unit as the attendant data.

There are circumstances when some holders such as photographers who hold a video image file desire attendant data representing an image service corresponding to processing of still images included in video data be edited. The processing unit includes an attendant data editing unit for editing attendant data to use the edited attendant data edited by the attendant data editing unit as the attendant data, so that a video image file is generated, constituted by attendant data in which the intentions of the user (holder) are reflected.

In the image service providing apparatus, an image service can be provided by using the following recording medium. More specifically, there is provided a recording medium on which attendant data representing an image service for a video image can be recorded or reproduced by a computer, wherein a video image file obtained by adding, to video data representing a plurality of continuous still images photographed by a photographing device, attendant data representing an image service corresponding to processing of the still images included in the video data is recorded.

DETAILED DESCRIPTION OF THE INVENTION

Figure 1:
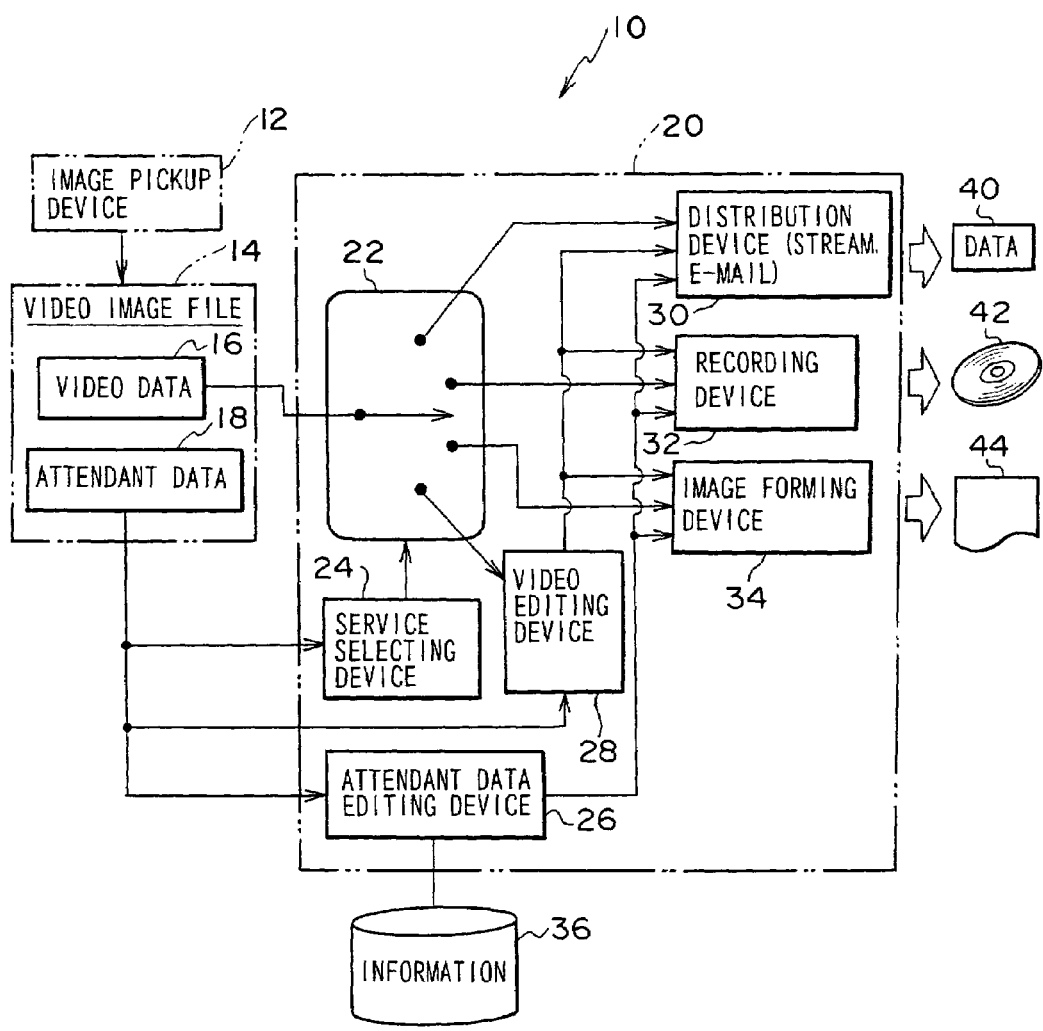
FIG. 1 is a block diagram showing a schematic configuration of an image service providing system according to the first embodiment of the present invention.

An example of an embodiment of the present invention will be described below with reference to the accompanying drawings. In this embodiment, the invention is applied to an image service providing system for processing an image service for a video image.

First Embodiment

In the image service providing system according to this embodiment, a video image file including video data constituted by a plurality of still images generated by an image pickup device such as a digital camera includes attendant data including a type of image service for one still image or a plurality of still images. On the basis of the attendant data, an image services such as video image distribution, data backup, and print formation performed by the video image file of video images photographed by the user are provided.

(Video Image File)

A video image handled in this embodiment, i.e., a video image file 14 constituted by a video data 16 and attendant data 18 will be described below. In this embodiment, in order to make it easy to comprehend a video image, almost like a still image, the video image is handled as the video image file obtained by adding attendant data to video data.

More specifically, a photographed image provided as a still image photographed by a digital camera or the like is circulated as an image file of a format (so-called EXIF format) in which not only the image data of the photographed image itself but also attribute data such as a file name or photographing conditions are included to make it easy to comprehend the photographed image.

The image file of the EXIF format includes, for each photographed image, not only image data but also, as attribute data, a file name, a model of digital camera used in photographing, a photographing date and time, various pieces of information (e.g., a shutter speed, a numerical aperture, an image quality mode (compression rate of the image data), a sensitivity, a mode of an exposure program, a photometric system, a mode of white balance, a focus mode, a sharpness mode, a focal distance, an exposure adjustment value, an ON/OFF state of an electronic flash, a correction value of the electronic flash, an ON/OFF state of a macro mode, and the like), and the like.

A video image is a still image group in which still images are continuous in a time series. One still image included in the still image group can be handled as one frame in the video image. Therefore, the video image can specify time and a position in units of frames (still image units).

For this reason, in this embodiment, a video image which is the still image group is handled as a video image file obtained by adding target attendant data to video data (image file group of still image group). The attendant data is data for specifying a use mode of the video image or for designating a range.

More specifically, the video image file 14 is constituted by the video data 16 and the attendant data 18. The video data can be constituted by the image file of the EXIF format which is continuous in a time series. Attribute data obtained by the image file of the EXIF format may be attributed to respective still image data or to a predetermined number of still image data. When the contents of the image file vary, the attribute data may be attributed to still image data serving as the frame of the image file.

The attendant data includes, in units of video images, in addition to video data, contents which are roughly classified into 8 items, i.e., status, index, frame print, e-mail distribution, GPS information, date information, model of camera, and password (PW) information as shown in Table 1.

TABLE 1

Attendant Data of Video Image File

| Item | Content | Frame No. |
|---|---|---|
| 1: Status | 10: Typical (used in digest edition) | (1:230), (4800:5010), (7620:7800) |
| | 11: Main (used in reproduction in normal mode) | (231:1340), (5901:6586), (7801:8900) |
| | 12: For Storage (used in only full reproduction) | (1341:4799), (5010:5900), (6587:7620), (8900:140021) |
| | 13: Unnecessary (delete in medium conversion or transmission) | (140022:218760) |
| 2: Index | 20: Print Index | 3, 510, 1201, 4902, 6010, 7700, 8230 |
| | 21: Monitor Index | 3, 265, 510, 1201, 4902, 5950, 6010, 6435, 7700, 8230 |
| 3: Frame Print | 30: L-size Print | 3 × 8, 265, 510, 4902, 5950, 6010, 6435 × 2, 8230 |
| | 31: 2L-size Print | 3 × 2, 6435 × 2 |
| | 32: Postcard Print | 3 × 220 |
| 4: E-Mail Distribution | 40: Movie mail to "△@□.com" | (5901:6586) |
| | 40: Movie mail to "X@○.co.jp" | (7801:8900) |
| | 40: Still mail to "△@○.co.jp" | 3, 265, 510, 1201 |
| 5: GPS Information | 50: Latitude of 38.21 Degrees North, Longitude of 134.12 Degrees East | (1:4799) |
| | 50: Latitude of 25.13 Degrees North, Longitude of 84.62 Degrees East | (4800:140021) |
| 6: Date Information | 60: "Thursday, Jul. 4, 2002" | (1:4799) |
| | 60: "Sunday, Jul. 7, 2002" | (4800:140021) |
| 7: Model of Camera | 70: Digital Camera | (1:4799) |
| | 71: Digital Video Camera | |
| | 72: Camera-built-in Mobile Terminal "△○" | (4800:8900) |
| | 73: Camera-built-in Watch "□□" | (8901:218760) |
| 8: PW Information | 80: password "NY020911" | (7801:8900) |
| | 80: password "niitakayamanobore" | (5901:6586) |

"Status" which is the first item of the attendant data represents handling of video data (importance of frame), and is constituted by application contents and application ranges. The application contents are subclassified into typical, main, for storage, and unnecessary. Frame numbers (Frame No.) correspond to the application ranges of the application contents. The item "status (typical)" represents a typical frame and a typical frame range in a video image file, and is mainly used to refer to the frame and the frame range when a digest edition is formed from the video image file. The item "status (main)" represents a main (standard) frame and a main frame range in the video image file, and is mainly used to refer to the frame and the frame range when the video image file is reproduced in a standard mode (normal mode). The item "status (for storage)" represents a frame and a frame range when the video image file is stored, and is used mainly to refer to the frame and the frame range when all video image files to be stored are reproduced (in a full mode). The item "status (unnecessary)" represents an unnecessary frame and an unnecessary frame range included in a video image file, and is mainly used to refer to the frames and the frame ranges to be deleted at the time of medium conversion or video image file transmission.

The item is represented by code information. In an example of Table 1, numbers 0 to 3 representing the orders of the application contents are continuously arranged in "1" representing "Status" of the first item. More specifically, the item "status (typical)" is represented by code information "10", the item "status (main)" is represented by code information "11", the item "status (storage)" is represented by code information "12", and the item "status (unnecessary)" is represented by code information "13". The application range is constituted by a start frame and an end frame (start frame: end frame).

"Index" which is the second item of the attendant data represents a position in the video data, and mainly represents the position of a frame at the time of index formation. Application contents are subclassified into two types, i.e., print index and monitor index. Frame numbers (Frame No.) correspond to the application ranges of the application contents. The print index represents a frame and a frame range when an index related to a video image file is printed, and the monitor index represents a frame and a frame range when the video image file is displayed on a monitor or the like. The print index is represented by code information "20", and the monitor index is represented by code information "21".

"Frame Print" which is the third item of the attendant data represents a position of print designation in video data and represents the position of a frame when a print is formed on the basis of the video data. Application contents are subclassified into three types, i.e., L-size print, 2L-size print, and Postcard print. Frame numbers (Frame No.) and numbers of prints correspond to of the application ranges of the application contents. The L-size print is represented by code information "30", the 2L-size print is represented by code information "31", and the Postcard print is represented by code information "32".

"E-Mail Distribution" which is the fourth item of the attendant data represents electric transmission of video data, and corresponds to a form of electric transmission, a destination, and an electric transmission range. Application contents are subclassified by the form of electric transmission, and the form of electric transmission includes the destination. In the example of Table 1, when a video image is transmitted by e-mail, the e-mail is represented by code information "40. When a still image is transmitted by e-mail, the e-mail is represented by code information "41". The contents include an address ("Δ@□.com", "X@○.co.jp", "Δ@○.co.jp"). Frame numbers (Frame No.) or frame ranges correspond to electric transmission ranges.

"GPS Information" which is the fifth item of the attendant data represents a position at the time of a photographing. As application contents, degree of latitude and degree of longitude data obtained from a GPS are used. Frame numbers (Frame No.) correspond to photographing ranges at the position. The GPS information is represented by code information "50".

"Date Information" which is the sixth item of the attendant data represents the date at the time of photographing. As application contents, year, month, date, time, day of week, and such like data are used. Frame numbers (Frame No.) correspond to photographing ranges at the time. The date information is represented by code information "60".

"Model of Camera" which is the seventh item of the attendant data represents the model of camera which is used in photographing, i.e., a camera by which video data is obtained. Application contents are constituted by the type and the model number of the camera. In the example of Table 1, the item is subclassified into four types represented by pieces of code information "70", "71", "72", and "73" which respectively represent a digital camera, a digital video camera, a camera-built-in mobile terminal, and a camera-built-in watch. Frame numbers (Frame No.) correspond to application ranges of the application contents.

"PW Information" which is the eighth item of the attendant data represents a password for video data, and mainly represents a position of a frame which it is desired to conceal. The application contents of the information include a secret identification code. A frame number (frame No.) corresponds to the application range of the information. "80" corresponds to the code information of the information.

In addition to the eight types of item described above, photographing conditions information such as focal distance and numerical aperture, personal information such as name, address, age, and sex of the user of the video image file, and financial settlement information such as the type, number, and the like of a credit card, can also be included in the attendant data.

The video image file 14 described above can be recorded on a recording medium (not shown). As examples of the recording, medium, SmartMedia®, Compact Flash®, Memory Stick®, and the like are known. When a video image file is recorded on a recording medium, the video image file can be recorded as an image file (e.g., an image file of EXIF format) obtained by adding photographing conditions such as the type of the camera and the use or otherwise of electronic flash photographing to the image data of the photographed image.

Therefore, an object is photographed by an image pickup device such as a digital camera, a video image file 14 is recorded on a recording medium by a read/write device such as a medium drive built in the image pickup device, and the video image file 14 is brought into a DPE shop or transmitted by communication, so that photo processing can be requested or image distribution performed. In addition, the video image file can be stored by the user or at a predetermined point.

(Conceptual Configuration)

FIG. 1 shows a conceptual configuration of a system, serving as an image service providing system 10 according to this embodiment, for realizing an image service by using the video image file 14 described above. The image service providing system 10 of this embodiment comprises an image service providing apparatus 20 to which the video image file 14 constituted by the video data 16 and the attendant data 18 is input. The video image file 14 is generated in an image pickup device 12 such as a digital camera and provided. The image service providing apparatus 20 provides various image services such as video image distribution, data backup, and print formation by the video image file 14 including a video image photographed by the user.

The image service providing apparatus 20 has a service switching device 22. The service switching device 22 is designed to input the video data 16 of the video image file 14 to the input side of the service switching device 22. The output side is connected to the input sides of a plurality of devices corresponding to the respective image services. The service switching device 22 is connected to a service selecting device 24 such that a service selection signal is input to a control side. The service switching device 22 is connected to one of the input side and the output side depending on the service selection signal from the service selecting device 24. More specifically, the service switching device 22 receives the video data 16 of the video image file 14 from the input side, and the input video data 16 is switched to the output side corresponding to an image service on the basis of the attendant data 18.

The service selecting device 24 is designed to input the attendant data 18 of the video image file 14 to the input side. The output side is connected to the control side of the service switching device 22.

The input sides of a distribution device 30, a recording device 32, and an image forming device 34 are connected to the output side of the service switching device 22. The distribution device 30 is used to distribute at least the video data 16 included in the video image file 14 or still image data of a still image included in the video data 16. As an example of the distribution device 30, a stream server or an e-mail server is cited. Distribution data 40 is output from the distribution device 30.

The recording device 32 is to record the video image file 14 on a recording medium. As an example of the recording device 32, a read/write device for recording the video image file 14 on a recording medium such as a DVD or a CDR for data backup is cited. In the recording device 32, a recording medium 42 such as DVDs or CDRs on which the video image file 14 is recorded is formed. The image forming device 34 is to form a still image obtained by the video data 16 included in the video image file 14. As an example of the image forming device 34, a photo printer is cited. In the image forming device 34, a print 44 of a still image obtained by the video data 16 included in the video image file 14 is formed.

The output side of the service switching device 22 is also connected to the input side of a video editing device 28. The video editing device 28 is designed to receive the attendant data 18 included in the video image file 14. The video editing device 28 is to edit the input video data 16 on the basis of the input attendant data 18. The output side of the video editing device 28 is connected to the input sides of the distribution device 30, the recording device 32, and the image forming device 34 such that the edited video data 16 outputted is input to the output side of the video editing device 28.

The attendant data 18 included in the video image file 14 is also input to the input side of an attendant data editing device 26. The attendant data editing device 26 is a device for editing the respective items of the attendant data 18 described above. The input sides of the distribution device 30, the recording device 32, and the image forming device 34 are connected to the attendant data editing device 26 such that the edited attendant data 18 is input to the attendant data editing device 26. An information memory 36 which can add various pieces of information and in which the various pieces of information are stored to read the various pieces of information is connected to the attendant data editing device 26.

Therefore, in the image service providing apparatus 20, with respect to the video data 16 obtained by an image pickup operation performed by the image pickup device 12 and the attendant data 18 which describes a service for the video data 16, the type of image service is specified by the service selecting device 24 on the basis of the attendant data 18, and a service selection signal is output to the service switching device 22.

In this manner, the service switching device 22 switches the connection to output the video data 16 to any one of the distribution device 30, the recording device 32, the image forming device 34, and the video editing device 28. Therefore, a process for the video data 16 based on the attendant data 18, i.e., any one of distribution, recording, image formation, and image editing for the video image file 14 can be easily executed.

Since the attendant data editing device 26 can also edit the attendant data 18, a change in process for the video data 16 or deletion of the video data 16 can be easily executed.

The input sides of the devices for inputting the video image file 14 to the image service providing apparatus 20 correspond to input units according to the invention, respectively, the service selecting device 24 corresponds to a unit for outputting data for setting the type of an image service by a setting unit according to the invention, and the respective devices, i.e., the attendant data editing device 26, the video editing device 28, the distribution device 30, the recording device 32, and the image forming device 34 correspond to execution units for processing image services of the processing unit according to the invention. In particular, the image forming device 34 corresponds to an image forming unit, the recording device 32 corresponds to an image recording unit, the video editing device 28 corresponds to a video editing unit, and the attendant data editing device 26 corresponds to an attendant data editing unit.

(Image Service Providing Device)

The image service providing apparatus 20 for executing the above conceptual configuration will be described in detail below. The image service providing apparatus 20 according to this embodiment is designed such that the image service providing apparatus 20 can be connected to a communication circuit (e.g., a network such as the Internet) 46, and such that the image service providing apparatus 20 can receive and transmit information by interactive communication through the communication circuit 46.

Figure 2:
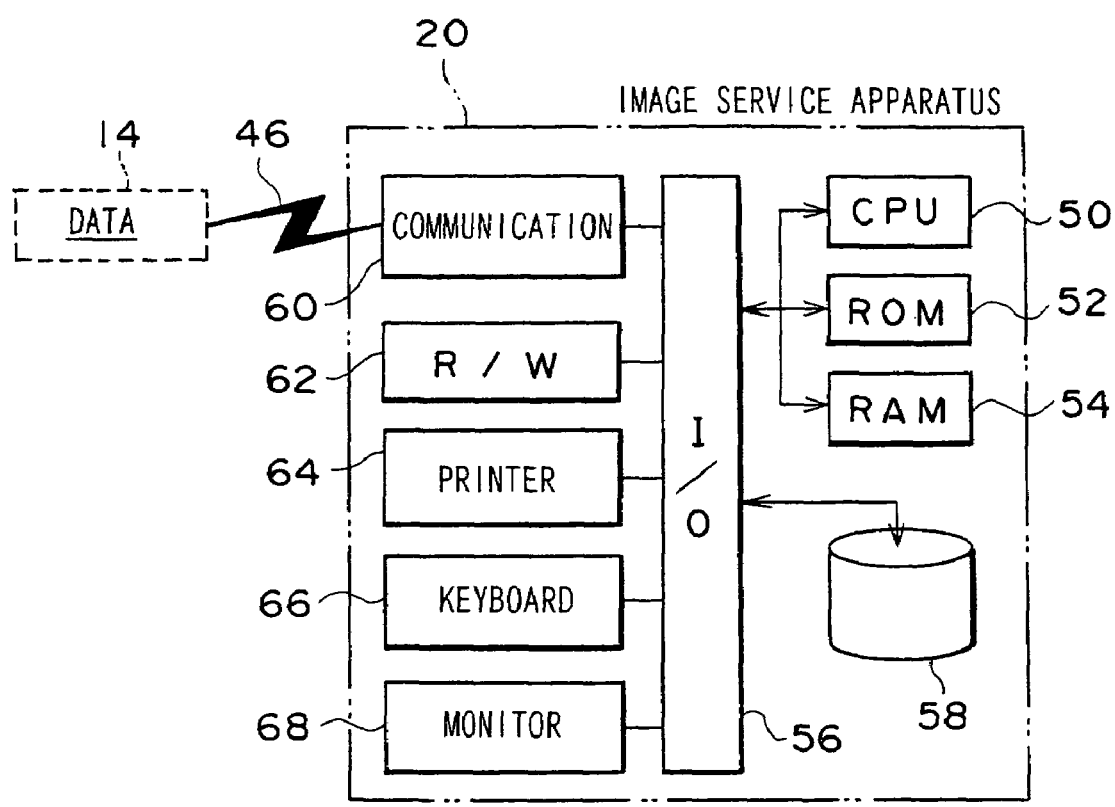
FIG. 2 is a block diagram showing a schematic configuration of an image service providing apparatus according to the first embodiment of the invention.

As shown in FIG. 2, the image service providing apparatus 20 according to this embodiment comprises a CPU 50, a ROM 52, a RAM 54, and an input/output port 56, which are connected to each other via a bus to obtain a computer configuration. An input device 66 such as a keyboard for inputting data or a command and display device 68 typified by a monitor for displaying the data, the command and progress of processing (to be described later) are connected to the input/output port 56. A storage memory 58 in which a processing program (to be described later) or various data are stored is also connected to the input/output port 56.

The image service providing apparatus 20 comprises a communication device 60 for connecting the image service providing apparatus 20 to the communication circuit 46 connected to the input/output port 56, and is designed such that data such as the video image file 14 transmitted from the outside of the image service providing apparatus 20 can be input to the image service providing apparatus 20. A read/ write (R/W) device 62 designed such that the recording medium 42 can be inserted into or removed from the read/write (R/W) device 62 and an image printer 64 for forming the print 44 are connected to the input/output port 56.

The read/write (R/W) device 62 is a device which reads data or a processing program from the recording medium 42 typified by recording media such as a flexible disk, an IC disk, a CDROM, a DVD, and an MO which use light or magnetism and which writes data or a processing program in the recording medium 42. The image printer 64 is a device for printing a still image included in the video image file 14.

(Operation of Image Service Providing Apparatus)

The operation of the image service providing apparatus 20 according to this embodiment will be described below. The image service providing apparatus 20 executes a main processing routine shown in FIG. 3 after the image service providing apparatus 20 is switched on.

In step 102, it is decided whether the video image file 14 has been received by the image service providing apparatus 20 or not. In step 102, the decision can be made by determining that the video image file 14 has been received by the communication device 60 through the communication circuit 46 and that the video image file 14 is read from the recording medium 42 by the read/write device 62. The video image file 14 may also be stored in the storage memory 58 in advance to be read.

In step 102, negative decisions are repeated until YES is determined. When YES is determined in step 102, the process proceeds to step 104 to recognize the video image file 14 constituted by the received video data 16 and the received attendant data 18, and an image service is specified in the next step 106. More specifically, the video image file 14 includes the attendant data 18 as described above. An image service to be executed for the video data 16 is described in the attendant data 18.

For example, in the specification of the image service in step 106, print index (code information: 20) of "Index" which is the second item of the attendant data in Table 1 and the respective items of the "Frame Print" which is the third item require print formation. When these items include frame numbers, it can be specified that image formation is required as an image service.

"E-Mail Distribution" which is the fourth item of the attendant data is an item which requires a still image or a video image to be electrically transmitted. When the item includes a frame number, it can be specified that video distribution is required as an image service.

"Status" which is the first item of Table 1 represents handling (importance of a frame) of video data, and is used in various image services. In this embodiment, when something is described in the "status for storage" item (code information: 12), it is specified that medium recording is required as an image service.

In this embodiment, when something is described in any one of the other classifications of "Status", i.e., typical (code information: 10), main (code information: 11), and unnecessary (code information: 13), it is specified that video editing is required as an image service.

However, as described above, an image service in step 106 can be specified on the basis of the attendant data 18 alone. However, some holders of the video image file 14 want to reflect their intentions when the video image file 14 is provided. For example, there are circumstances when updating of designation and deletions are performed, such as adding designations for distributing the video image file 14, adding distribution destinations, adding types of service, and deleting the same. Therefore, the process of specifying an image service in step 106 may include a process (service input process) of urging the user to input an image service.

In the next step 108, the editing process of the attendant data 18 is executed. Although the details of step 108 will be described later (FIG. 4), the outline of the editing process is a process of editing some or all of the attendant data 18 recognized in step 104. The process can edit all items of attendant data 18 specified in Table 1.

Further, the process in step 108 does not always edit the attendant data 18. More specifically, the process includes a process of passing over the attendant data 18 without editing it. The process in step 108 corresponds to the process of the attendant data editing device 26 in FIG. 1.

In the next step 110, it is determined on the basis of the attendant data 18 whether the type of an image service specified in step 106 corresponds to video distribution or not. In the example of Table 1, as the video distribution, "E-Mail Distribution" which is the fourth item is set as a direct item. When the contents and the frame number are described in the fourth item, YES is determined in step 110.

As in stream distribution, when video data of a video image is distributed as stream data, the first item is also employed. In the stream distribution, the video image file 14, i.e., the video data 16 is stored such that the video data 16 can be reproduced, and the video data 16 is distributed as requested. In this case, as described above, in step 106, stream distribution may be designated including a process (service input process) of urging the user to input an image service.

In this embodiment, when the attendant data 18 is added, an intention of the holder of the video image file 14 is reflected in the contents (code information) and the frame number for the video data 16. For this reason, when a video image is to be distributed, the intention of the holder of the video image file 14 regarding reproduction or the like of the video image can be reflected with reference to the contents (code information) and the frame number of the video image file 14.

When NO is determined in step 110, the process proceeds to step 114. When YES is determined in step 110, the process proceeds to a video distribution process (FIG. 5) (to be described later) in step 112 and then moves on to step 114. In step 114, it is decided on the basis of the attendant data 18 whether the type of image service specified in step 106 is medium recording or not.

In the example in Table 1, for the medium storage, "Status" which is the first item is a direct item. When the contents and the frame number are described in the first item, YES is determined in step 114, and the process proceeds to a medium recording process (FIG. 6) (to be described later) in step 116 and moves on to shift step 118. On the other hand, when NO is determined in step 114, the process proceeds directly to step 118.

In step 118, it is decided on the basis of the attendant data 18 whether the type of image service specified in step 106 is image formation or not. In the examples in Table 1, the second item and the third item of Table 1 are direct items. When the contents and the frame number are described in these items, YES is determined in step 118, and the process proceeds to an image forming process (FIG. 7) (to be described later) and then moves on to step 122. On the other hand, when NO is determined in step 118, the process proceeds directly to step 122.

In step 122, it is determined on the basis of the attendant data 18 whether the type of image service specified in step 106 is video editing or not. In the example of Table 1, the first item of Table 1 is a direct item. When the contents and the frame number are described in the item, YES is determined in step 122, the process proceeds to a video editing process (FIG. 8) (to be described later) in step 124 and then moves on to step 126. On the other hand, when NO is determined in step 122, the process proceeds directly to step 126.

In step 126, it is determined whether all the processes for the image service described in the attendant data 18 are terminated or not. When NO is determined in step 126, a return to step 102 is made in order to repeat the processes. When YES is determined in step 126, the routine of the processes is completed.

The specification of the image service in step 106 corresponds to specification of an image service by the service selecting device 24 in FIG. 1. The transition of processes depending on the determination results in steps 110, 114, 118, and 122 corresponds to the switching between image services in the service switching device 22.

The process in step 112 corresponds to the process in the distribution device 30 in FIG. 1. The process in step 116 corresponds to the process performed in the recording device 32 in FIG. 1. The process in step 120 corresponds to the process performed in the image forming device 34 in FIG. 1. The process in step 124 corresponds to the process performed in the video editing device 28 in FIG. 1.

In this manner, the image service providing apparatus 20 according to this embodiment selects an image service from the attendant data 18 included in the video image file 14 and performs the selected image service. For this reason, the image service providing apparatus 20 can easily provide an image service intended by a holder of the video image file 14.

Figure 4:
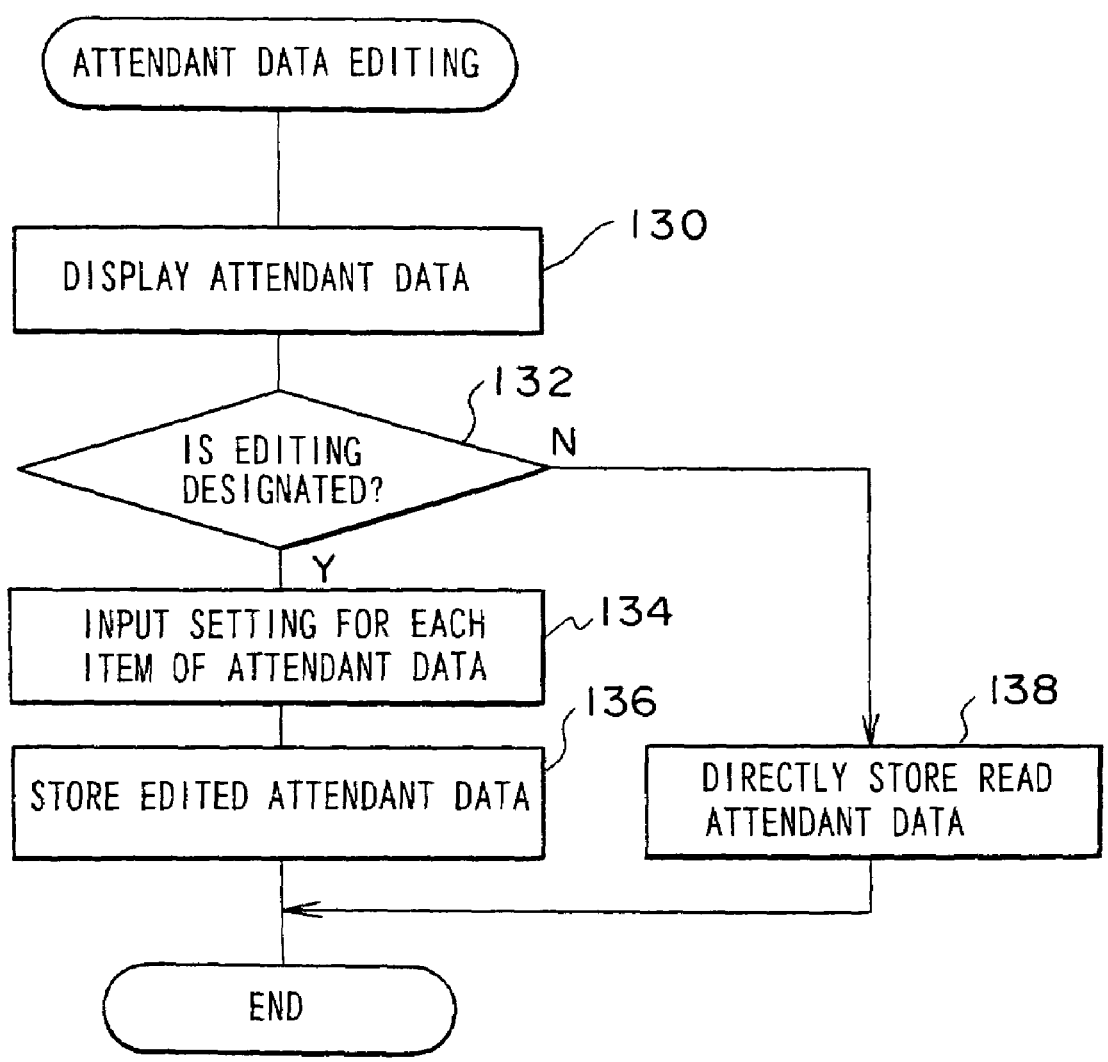
FIG. 4 is a flow chart showing a flow of an attendant data editing process serving as an image service according to the first embodiment of the invention.

Next, an attendant data editing process in step 108 will be described in detail below. In the attendant data editing process in step 108, the process routine in FIG. 4 is executed.

When the attendant data editing process is executed, the process proceeds to step 130 to display the attendant data 18 on the display device 68. The display items are the contents and the frame numbers of the respective items shown in Table 1. In the next step 132, it is determined whether designation of editing has been made or not. The decision in step 132 corresponding to a designation for determining whether editing should be performed or not is made by the input device 66. When the designation that editing should be performed is determined, YES is determined in step 132, and the process proceeds to step 134. When the designation that editing is not to be performed is determined, NO is determined in step 132, and the process proceeds to step 138 to directly store the attendant data 18 and thus terminate the routine.

In step 134, the respective items of the attendant data 18 are read. The attendant data 18 is displayed on the display device 68 to edit the attendant data 18. A holder of the video image file 14 or an operator who receives a designation of the holder inputs a designation for editing the attendant data 18 by the input device 66. Therefore, in step 134, the value (input value of the input device 66) of the designation input by the holder or the operation is read, so that the respective items of the attendant data 18 are read.

In the next step 136, the attendant data 18 is edited by using the value read in step 134 as an editing value, and the edited attendant data 18 is stored in the storage memory 58 as the edited attendant data 18, thus terminating the routine.

In this manner, in the process (process shown in FIG. 4) in step 108, since the attendant data 18 included in the input video image file 14 can be edited, holders of the video image file 14 can freely change their intentions with regard to the video image file 14.

The attendant data 18 used in this embodiment can include password (PW) information as the eighth item. The PW information is data which can conceal a designated frame in the video data 16 or the entire video data 16. For this reason, when the video image file 14 is provided such that the video image file 14 includes the PW information, the video image file 14 can be provided only to a designated user who has obtained in advance concealed information such as a secret identification code or a password.

Figure 5:
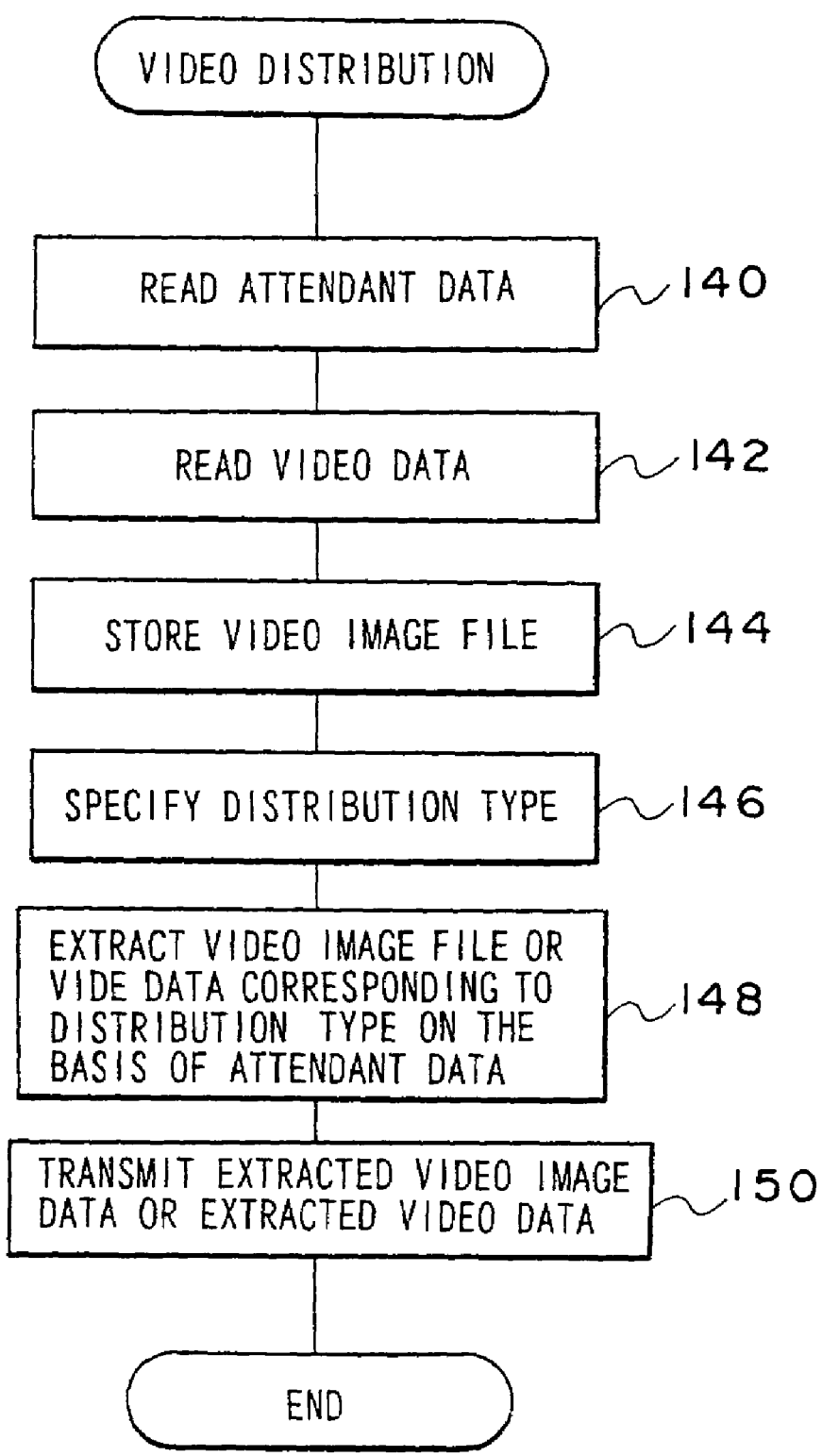
FIG. 5 is a flow chart showing a flow of a video data distribution process serving as an image service according to the first embodiment of the invention.

A video distribution process in step 112 will be described in detail below. In the video distribution process in step 112, the process routine in FIG. 5 is executed.

When the video distribution process is executed, the process proceeds to step 140 to read the attendant data 18 which has been stored in advance (step 136 or step 138 in FIG. 4). In the next step 142, the video data 16 (data recognized in step 104 in FIG. 3) of the input video image file 14 is read. In the next step 144, the video image file 14 obtained by adding the attendant data 18 read in step 140 to the video data 16 read in step 142 is formed, and the formed video image file 14 is stored in the storage memory 58.

After the distribution type of the stored video image file 14 is specified in the next step 146 in the following step 148, the video image file 14 or the video data 16 corresponding to the distribution type is extracted. More specifically, the specification in step 146 can be performed by determining the contents of a corresponding item of the attendant data 18 included in the stored video image file 14. For example, when e-mail distribution which is the fourth item is set as the item of the attendant data 18, it can be determined by code information whether an image is distributed as a video image or a still image.

In an extraction process in step 148, a frame number which is described on the basis of the attendant data 18, i.e., depending on a classification item of the distribution type specified in step 146 is read, and the frame of the video data 16 corresponding to the frame number is extracted. When a video image is designated, the entire video data 16 or a plurality of frames which are continuous in a time-series (still images) are extracted. When a still image is designated, an independent frame or a plurality of frames are extracted. In the process in step 146, a destination described depending on the classification item of the specified distribution type is also extracted. In this manner, the destination to which the user intends that the images be distributed can be specified.

In the next step 150, the video image file 14 extracted in step 148 and the video data 16 or a frame (still image) included in the video data 16 are transmitted. In this transmission, the data or the file is transmitted to the destination specified in step 148, thus completing this routine. In step 150, the communication device 60 is used to transmit the data or the file to another device through the communication circuit 46.

In this manner, in the process (process shown in FIG. 5) in step 112, a frame corresponding to the intention of the holder of the video image file 14 can be distributed (transmitted) on the basis of the attendant data 18 included in the video image file 14. For this reason, the frame can be distributed in a state in which the intention of the holder of the video image file 14 is reflected in distribution.

Figure 6:
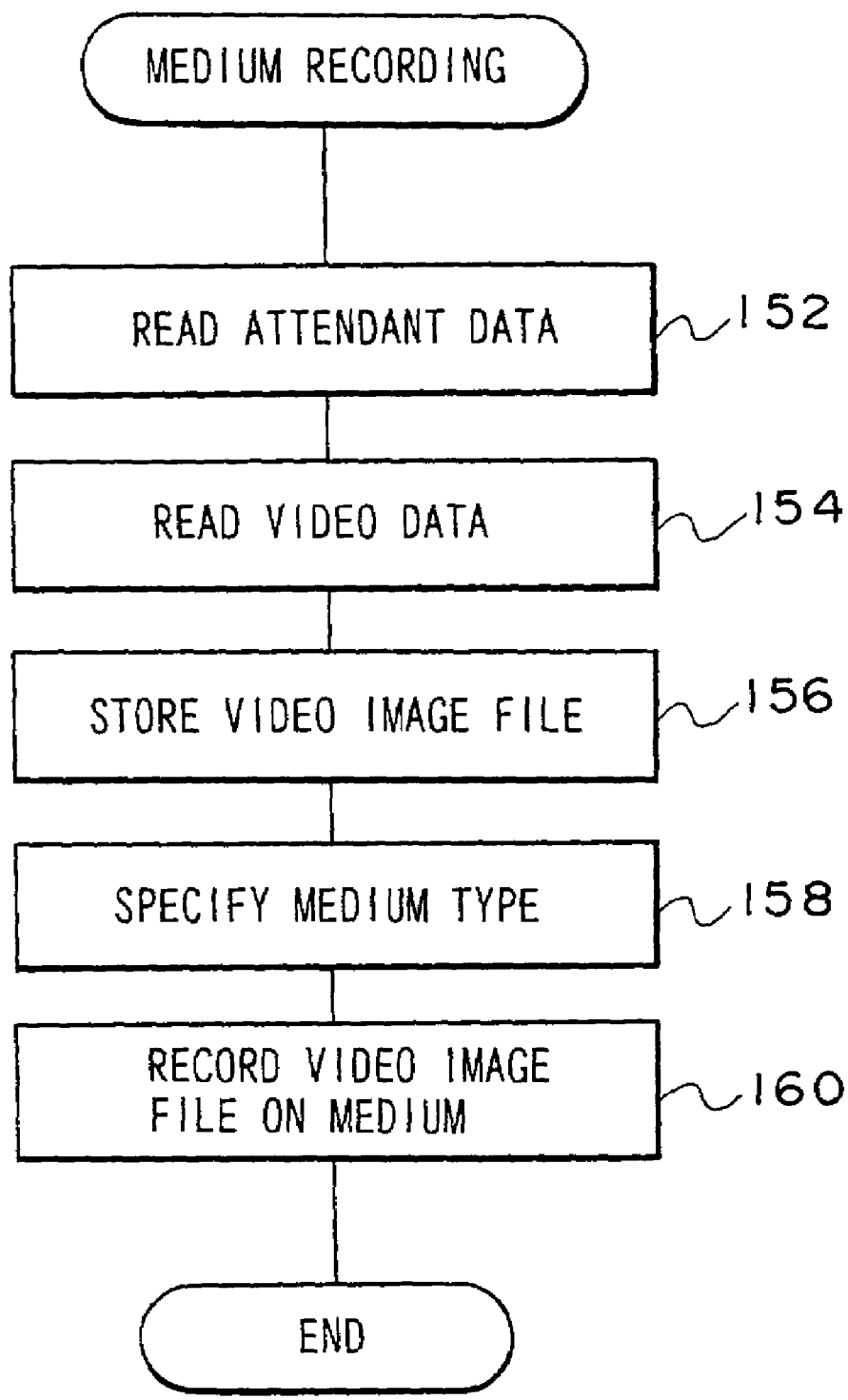
FIG. 6 is a flow chart showing a flow of a medium recording process serving as an image service according to the first embodiment of the invention.

A medium recording process in step 116 will be described in detail below. In the medium recording process in step 116, the process routine in FIG. 6 is executed.

When the medium recording process is executed, the process proceeds to step 152 to read the attendant data 18 which has been stored in advance (in step 136 or step 138 in FIG. 4). In the next step 154, the video data 16 (data recognized in step 104 in FIG. 3) of the input video image file 14 is read. In the next step 156, the video image file 14 obtained by adding the attendant data 18 read in step 152 to the video data 16 read in step 154 is formed, and the formed video image file 14 is stored in the storage memory 58.

In the next step 158, the medium type of the stored video image file 14 is specified. Thereafter, the video image file 14 is recorded on the recording medium 42 corresponding to the medium type in the next step 160 to terminate this routine. In step 160, the video image file 14 is recorded on the recording medium 42 by using the read/write device 62.

The specification of the medium type in step 158 is a process of determining the type of a medium on which the video image file 14 is recorded. A predetermined medium type may be automatically set, or a medium intended by a holder may be set by a designation input by the input device 66.

In step 158, a frame number described depending on the "Status" item of the attendant data 18 is read, and the frame of the video data 16 corresponding to the frame number may be extracted and recorded. More specifically, in this embodiment, the video data 16 regulated by the frame number described for storage (code information 12) is recorded. However, the video data 16 arranged with respect to another classification item may be recorded.

In this manner, in the process in step 116 (process shown in FIG. 6), the input video image file 14 can be recorded on a medium corresponding to an intention of a holder of the video image file 14.

Figure 7:
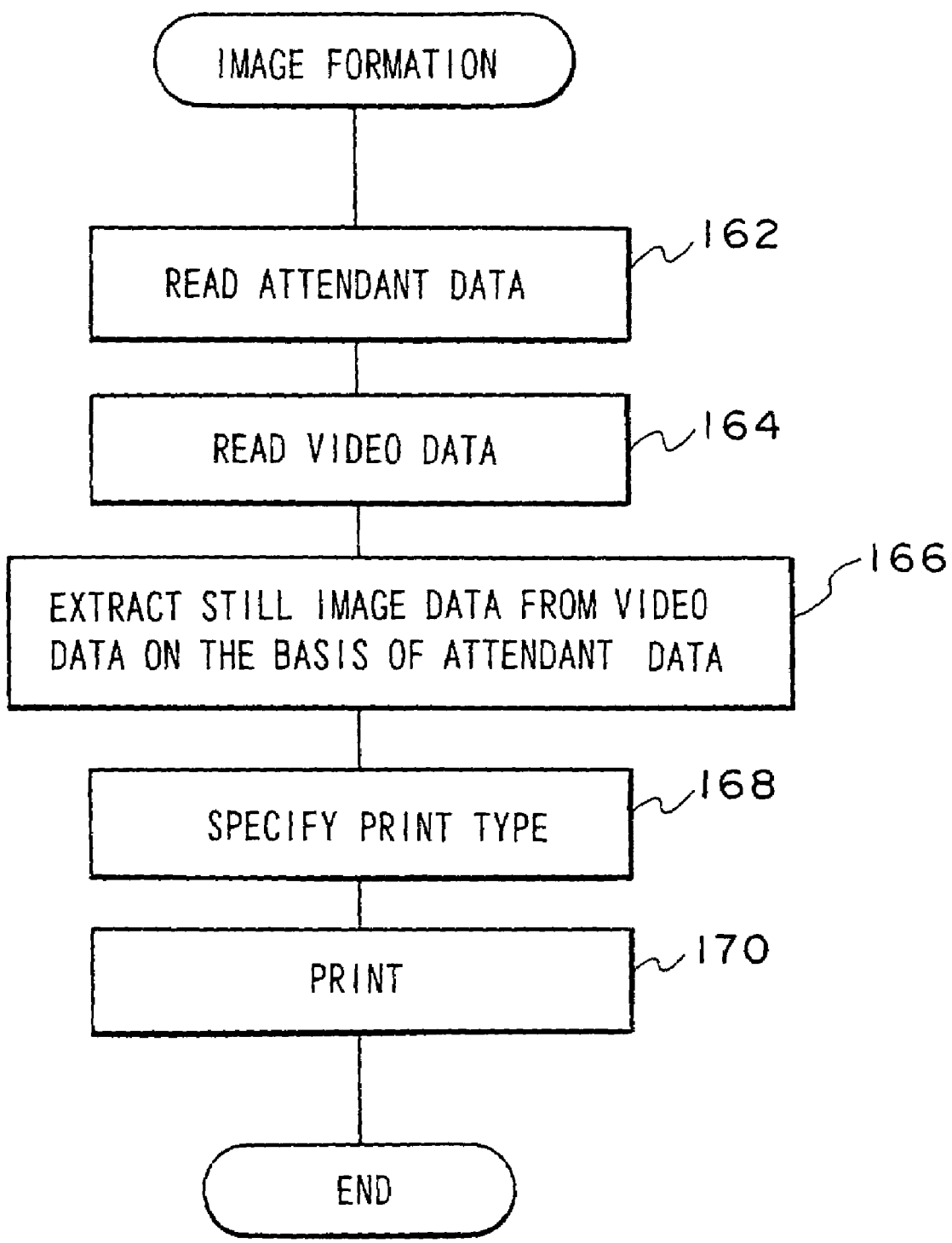
FIG. 7 is a flow chart showing a flow of an image forming process serving as an image service according to the first embodiment of the invention.

An image forming process in step 120 will be described in detail below. In the image forming process in step 120, the process routine in FIG. 7 is executed.

When the image forming process is executed, the process proceeds to step 162 to read the attendant data 18 which has been stored in advance (in step 136 or step 138 in FIG. 4). In the next step 164, the video data 16 (data recognized in step 104 in FIG. 3) of the input video image file 14 is read. In the next step 166, a still image (still image data) corresponding to a frame number based on the attendant data 18 read in step 162 is extracted from the video data 16 read in step 164.

In the next step 168, a print type of the stored video image file 14 is specified. Thereafter, after a print corresponding to the print type is formed in the next step 160, this routine is completed. In step 160, a designated still image of the video image file 14 is formed for the image printer 64 by using the image printer 64.

The specification of the print type in step 168 is a process for determining the size and the format of a print for image formation. Among items of the attendant data 18, an index print or a frame print is specified, so that the print can be classified into a single image print or a print of a set of images. When the frame print is determined, the print size can be specified by the code information. For this reason, the size of a sheet of printing paper can also be set. In this specification, the setting can also be changed such that the print size is a print size intended by the holder by a designation input by the input device 66.

In the process in step 120 (process shown in FIG. 7), a designated still image can be formed on the basis of the input video image file 14. For this reason, a still image corresponding to an intention of the holder can be formed to a desired print size on the basis of the video image file 14.

Figure 8:
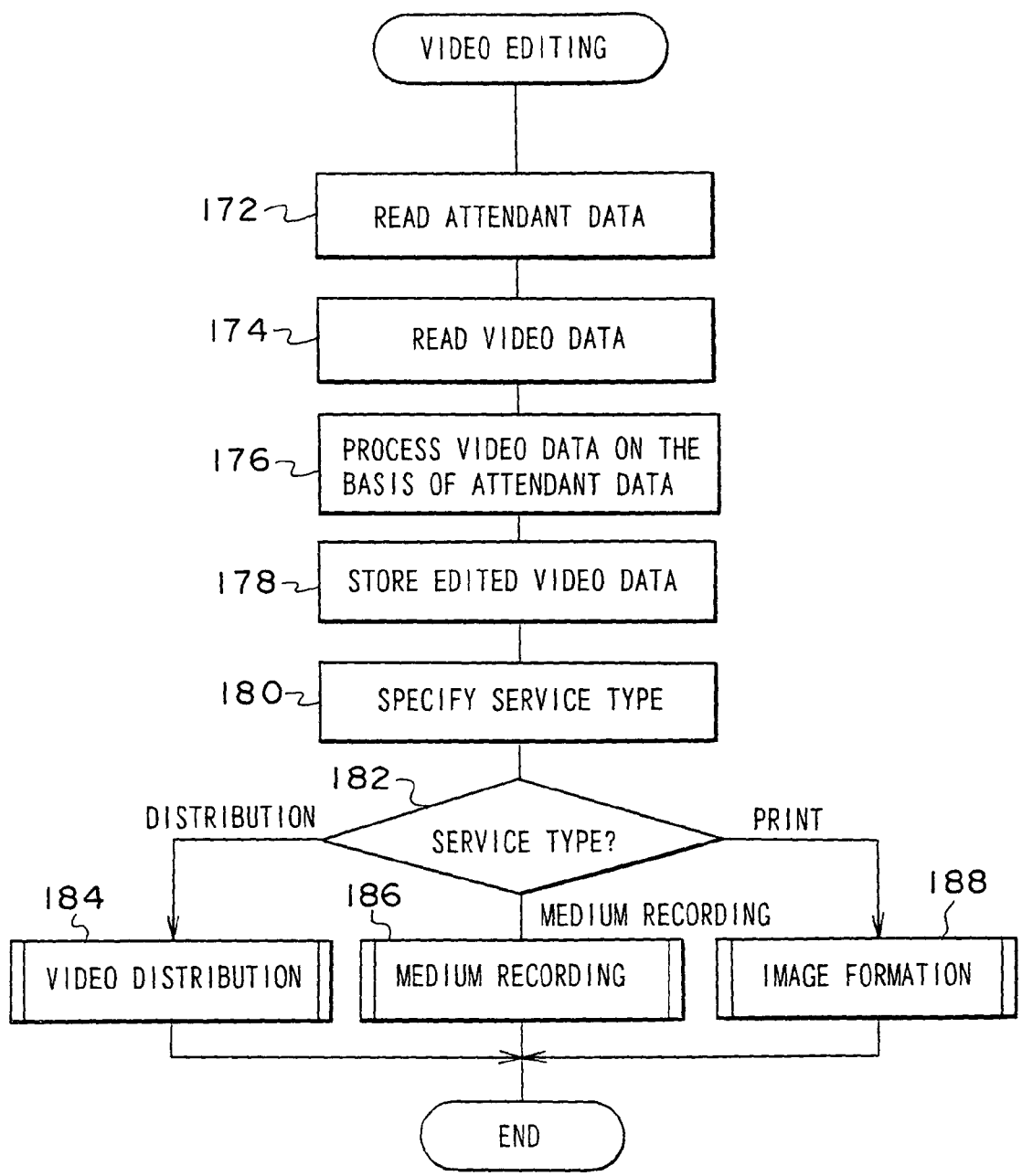
FIG. 8 is a flow chart showing a flow of a video editing process serving as an image service according to the first embodiment of the invention.
Figure 9:
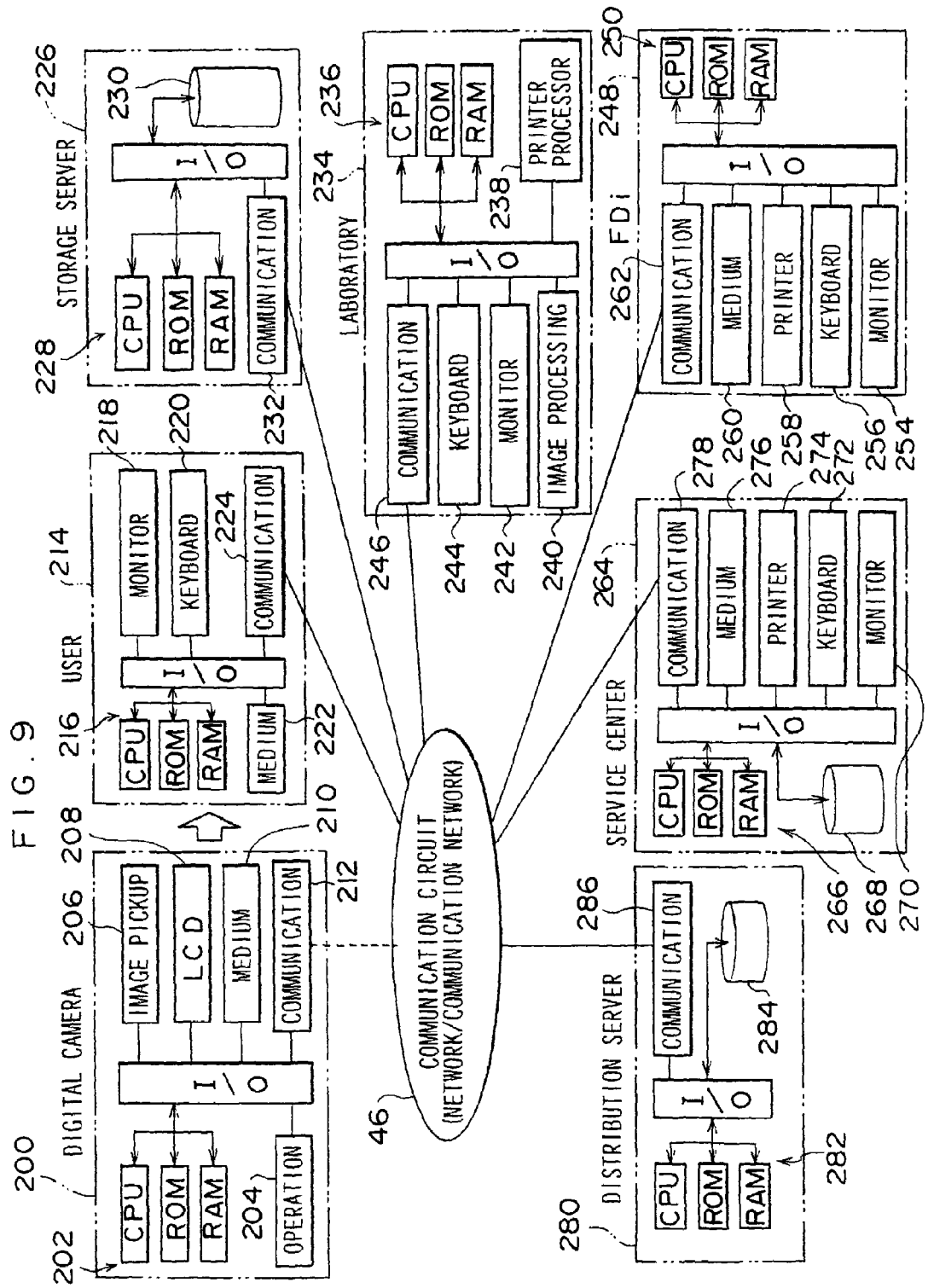
FIG. 9 is a block diagram showing a schematic configuration of an image service providing system according to the second embodiment of the invention.

An image data editing process in step 124 will be described in detail below. In the video data editing process in step 124, the process routine in FIG. 8 is executed.

When the video data editing process is executed, the process proceeds to step 172 to read the attendant data 18 which has been stored in advance (in step 136 or step 138 in FIG. 4). In the next step 174, the video data 16 (data recognized in step 104 in FIG. 3) of the input video image file 14 is read. In the next step 176, the video data 16 read in step 154 is processed on the basis of the attendant data 18 read in step 172.

More specifically, in this embodiment, when something is described in "Status" classification items, it is specified that video editing is required as an image service. Therefore, in step 176, when a frame number is described in at least one of these classification items, the video data 16 constituted by a frame corresponding to the described frame number is extracted.

When processing of the video data 16 is finished in step 176, the processed video data 16 is stored in the storage memory 58 in step 178.

In the next step 180, the type of an image service corresponding to the video image file 14 by the processed video data 16 is specified. Thereafter, the process proceeds to step 182. In step 180, an image service can be specified by determining an item described in the attendant data 18.

In step 182, a decision corresponding to the type of image service specified in step 180 is performed. When the image service is video distribution, the process proceeds to step 184. When the image service is medium recording, the process proceeds to step 186. When the image service is image formation, the process proceeds to step 188. Upon completion of these processes, this routine is terminated.

The process in step 184 executes the video distribution process shown in FIG. 5. The process in step 186 executes the medium recording process shown in FIG. 6. The process in step 188 executes the image forming process shown in FIG. 7.

In this manner, the process in step 124 (process shown in FIG. 8), with respect to the input video image file 14, the video data 16 corresponding to the intention of the holder of the video image file 14 can be edited and processed.

As described above, in this embodiment, the video image file 14 constituted by the video data 16 obtained by photographing performed by the image pickup device 12 and the attendant data 18 in which an image service for the video data 16 is described is recognized and processed in the image service providing apparatus 20. For this reason, an image service intended by the holder of the video image file 14, i.e., a photographer or user can be easily provided.

Second Embodiment

The second embodiment of the invention will be described below. In this embodiment, the invention is applied to a case in which the processes of the image services are executed at corresponding bases. Since this embodiment has practically the same configuration as that of the embodiment described above, the same reference numerals as in the first embodiment denote the same parts in the second embodiment, and a description thereof will be omitted.

FIG. 1 shows a conceptual configuration of an image service providing system 11 according to this embodiment. The image service providing system 11 according to this embodiment involves a digital camera 200 for forming an video image file 14 to meet a request for an image service such as photo print formation from the user, the user computer 214 installed in the user's home, a storage server 226 for performing an image service for storing the video image file 14 or still images, a laboratory computer 234 installed in a processing station which performs an image service such as a photo print process, a reception computer (to be referred to as an FDi) 248 installed in a reception shop typified by a so-called minilab which receives a request for an image service such as photo print formation from the user, a service center 264 which executes various processes related to an image service process, and a distribution server 280 which performs a service for distributing an image.

The image service providing system 11 according to this embodiment is designed such that the image service providing system 11 can be connected to a communication circuit (e.g., a network such as the Internet) 46, and is designed such that the image service providing system 11 can receive and transmit information by interactive communication through a communication circuit 46.

The digital camera 200 includes an image pickup unit 206 such as a digital still camera or a digital video camera designed to photograph a still image or a video image or a digital still camera built in a mobile terminal such as a mobile telephone or a PDA. The image pickup unit 206 is connected to a computer 202 in which a CPU, a ROM, a RAM, and an input/output port (I/O) are connected via a bus. In the digital camera 200, the computer 202 includes a communication unit 212 for externally communicating the video image file 14, an LCD 208 for displaying an image, and a medium drive 210 for storing the video image file 14 onto the recording medium 42 and reading the video image file 14 therefrom. The digital camera 200 may have any one of the communication unit 212 and the medium drive 210 to request an image service.

The user computer 214 is provided with a computer 216 in which a CPU, a ROM, a RAM, and an input/output port (I/O) are connected via a bus. A medium drive 222 for reading or writing the video image file 14 or the like, a monitor 218 for displaying an image, a keyboard 220, and a communication unit 224 for externally communicating the video image file 14 are connected to the computer 216.

The storage server 226 is provided with a computer 228 in which a CPU, a ROM, a RAM, and an input/output port (I/O) are connected via a bus. A storage memory 230 for storing the video image file 14 or the like and a communication unit 232 for externally communicating the stored data such as the video image file 14 are connected to the computer 228.

The laboratory computer 234 is provided with a computer 236 in which a CPU, a ROM, a RAM, and an input/output port (I/O) are connected via a bus. A communication unit 246 for communicating the video image file 14 or the like, a monitor 242 for displaying an image or the like, a keyboard 244, an image processing device 240 for correcting the video image file 14 or the like to improve the image quality, and a printer 238 for printing a still image included in the video image file 14 are connected to the computer 236.

The reception computer 248 is provided with a computer 250 in which a CPU, a ROM, a RAM, and an input/output port (I/O) are connected via a bus. A communication unit 262 for communicating the video image file 14 or the like, a monitor 254, a keyboard 256, a medium drive 260 for storing or reading the video image file 14 in/from the recording medium 42, and a printer 258, including an image processing device for improving the image quality of the video image file 14 or the like, for printing a still image included in the video image file 14 are connected to the computer 250.

The service center 264 is provided with a computer 266 in which a CPU, a ROM, a RAM, and an input/output port (I/O) are connected via a bus. A communication unit 278 for communicating the video image file 14 or the like, a monitor 270, a keyboard 272, a printer 274 for printing a still image included in the video image file 14, a medium drive 276 for storing or reading the video image file 14 in/from the recording medium 42, and a storage device 268 for storing various data and process routines are connected to the computer 266.

The distribution server 280 is provided with a computer 282 in which a CPU, a ROM, a RAM, and an input/output port (I/O) are connected via a bus. A communication unit 286 for communicating the video image file 14 or the like and a memory 284 for storing the video image file 14 to be distributed are connected to the computer 282.

The image service providing system 11 can include, in addition to the above configuration, a settlement server for financial settlements, an image processing server for performing only image processing, and an application server for performing various applications.

In the above description, each of the devices is constituted by one computer. Each device is not limited to one computer. Distribution processing may be performed by a plurality of computers, or a signal may be received or transmitted by a plurality of computers.

The operation of the image service providing system 11 according to this embodiment will be described below. In this embodiment, the service center 264 corresponds to the image service providing apparatus 20 according to the embodiment. In the service center 264, the same process as the process routine shown in FIG. 3 is executed.

The video data 16 formed by photographing performed by the digital camera 200 is restructured as the video image file 14 together with the attendant data 18, and is transmitted to the service center 264 through the communication unit 212, or the video data 16 is stored in the recording medium 42 by the medium drive 210 of the digital camera 200. Data in the recording medium 42 is read by the user computer 214 and transmitted to the service center 264 through the communication unit 224.

Figure 3:
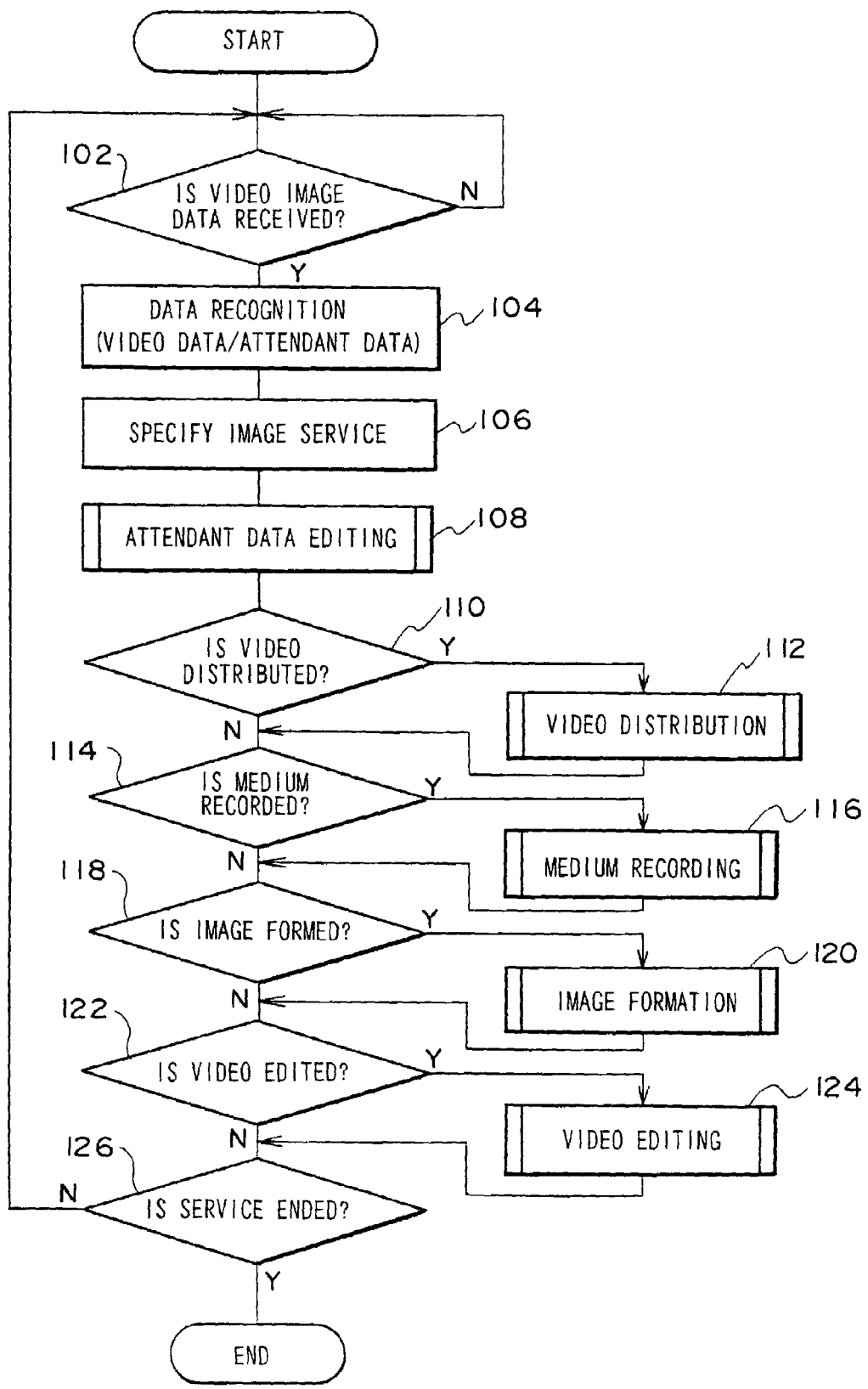
FIG. 3 is a flow chart showing a flow of an image service process executed by the image service providing apparatus according to the first embodiment of the invention.

In the service center 264, after the power supply is turned on, the main process routine shown in FIG. 3 is executed. As described above, when the service center 264 receives the video image file 14, the service center 264 recognizes the video image file 14 to specify an image service (steps 102 to 106 in FIG. 3).

An editing process for the attendant data 18 is executed (step 108). The editing process for the attendant data 18 is not always executed by the service center 264. For example, when it can be determined by the user computer 214 that the editing process has ended in advance, the process can be omitted. In addition, an editing device (not shown) may be connected to the communication circuit 46, so that the editing process may be performed by the editing device (not shown).

The video image file 14 is transmitted to a device corresponding to the type of specified image service on the basis of the attendant data 18 to execute the image service.

More specifically, when the type of image service is video distribution (YES in step 110), the video image file 14 is transmitted to the distribution server 280. As in stream distribution, when the video data of a video image is temporarily stored as stream data and distributed, the video data may be stored in the storage server 226. In the distribution server 280, the process routine shown in FIG. 5 is executed. In this case, at the beginning of the process, a process of receiving the video image file 14 may be added. More specifically, the distribution server 280 functions as an e-mail server, a video mail server, and a stream server.

When the type of image service is medium recording (YES in step 114), the video image file 14 is transmitted to the reception computer 248, and a medium recording process for the video image file 14 is executed in the medium drive 260 of the reception computer 248. In the reception computer 248, the process routine in FIG. 6 is executed. In this case, at the beginning of the process, a process of receiving the video image file 14 may be added. The same process as described above may be executed by the medium drive 276 of the service center 264.

Similarly, when the type of the image service is image formation (YES in step 118), the video image file 14 is transmitted to any one of the laboratory computer 234 and the reception computer 248, and a print forming process is executed. In the laboratory computer 234 or the reception computer 248, the process routine in FIG. 7 is executed. In this case, at the beginning of the process, a process of receiving the video image file 14 may be added.

When the type of image service is video editing (YES in step 122), the video image file 14 is transmitted to the reception computer 248, and a video editing process for the video image file 14 is executed in the reception computer 248. In the reception computer 248, the process routine in FIG. 8 is executed. In this case, at the beginning of the process, a process of receiving the video image file 14 may be added. The same process as described above may be executed by the service center 264.

In this manner, in the image service providing system 11 according to this embodiment, an image service is selected on the basis of the attendant data 18 included in the video image file 14, and the video image file 14 is electrically transmitted to respective bases at which the selected service is performed, so that the video image file 14 can be processed. For this reason, the image service can be executed at a large number of process bases connected to the communication circuit 46. The number of types of process which can be executed, is larger than the number of types of processes executed by a single device, and load sharing can be achieved.

Each of the embodiments describes a case in which image services corresponding to items included in the attendant data 18 are processed. However, the invention is not limited to the embodiments. More specifically, an item for a service related to a video image is added to the attendant data 18, and the service can be easily processed.

What is claimed is:

1. An image service providing apparatus comprising:
   an input unit for inputting a video image file obtained by adding, to video data representing a plurality of continuous time-sequential still images photographed by a photographing device as frames of a video image, attendant data including a first data representing an image service to be processed on a range of frames of the video data corresponding to a subset of the plurality of continuous time-sequential still images and a second data representing an image service to be processed on a still image corresponding to a specific frame of the video data, the image service being at least one of forming a still image, recording the video image file, distributing a still image or the video data, or editing the video data;
   a setting unit for setting a type of the image service on the basis of the attendant data included in the video image file by the input unit; and
   a processing unit for processing the image service on the range of frames of the video data and on the still image corresponding to the specific frame of the video data for the video data included in the video image file input by the input unit on the basis of the type of the image service set by the setting unit.

2. An image service providing apparatus according to claim 1, wherein the attendant data includes photographing conditions of the photographing device at a time when the video data is obtained.

3. An image service providing apparatus according to claim 2, wherein the photographing conditions are common to the entire video image file.

4. An image service providing apparatus according to claim 2, wherein the photographing conditions differ depending on the still images of the video data included in the video image file.

5. An image service providing apparatus according to claim 1, wherein the attendant data includes a concealed condition for setting the video data to make it possible to process the video data.

6. An image service providing apparatus according to claim 1, wherein the processing unit includes an image forming unit for forming a still image on a recording material.

7. An image service providing apparatus according to claim 1, wherein the processing unit includes an image recording unit for recording the video image file on a recording medium.

8. An image service providing apparatus according to claim 1, wherein the processing unit includes an image distribution unit for distributing a still image to another apparatus.

9. An image service providing apparatus according to claim 1, wherein the processing unit includes a video editing unit for editing the video data, and processes the edited video data edited by the video editing unit as the video data.

10. An image service providing apparatus according to claim 1, wherein the processing unit includes an attendant data editing unit for editing the attendant data, and uses the edited attendant data edited by the attendant data editing unit as the attendant data.

11. A recording medium on which attendant data representing an image service for a video image can be recorded or reproduced by a computer, comprising:
    a video image file comprising:
        video data representing a plurality of continuous time-sequential still images photographed by a photographing device as frames of a video image, and
        attendant data including a first data representing an image service to be processed on a range of frames of the video data corresponding to a subset of the plurality of continuous time-sequential still images and a second data representing an image service to be processed on a still image corresponding to a specific frame of the video data, wherein
        the image service is at least one of forming a still image, recording the video image file, distributing a still image or the video data, or editing the video data,
    wherein, when read by a computer, the attendant data enables the range of frames of the video data and the still image corresponding to the specific frame of the video data to be processed by an image service providing apparatus according to the image service represented by the first data and the second data, respectively.

* * * * *